US008544459B2

(12) United States Patent
Rees, Jr.

(10) Patent No.: US 8,544,459 B2
(45) Date of Patent: Oct. 1, 2013

(54) PORTABLE GRILL ASSEMBLY

(76) Inventor: Robert Rees, Jr., Cumming, IA (US)

( * ) Notice: Subject to any disclaimer, the term of this patent is extended or adjusted under 35 U.S.C. 154(b) by 441 days.

(21) Appl. No.: 12/473,021

(22) Filed: May 27, 2009

(65) Prior Publication Data

US 2010/0300425 A1 Dec. 2, 2010

(51) Int. Cl.
*A47J 37/00* (2006.01)
*F24B 3/00* (2006.01)

(52) U.S. Cl.
USPC ...... 126/25 R; 126/9 B; 126/25 A; 126/39 R; 126/9 R; 126/299 C; 99/421 H

(58) Field of Classification Search
USPC .......... 126/25 R, 38, 25 B, 9 R, 9 B; 99/340, 99/357
See application file for complete search history.

(56) References Cited

U.S. PATENT DOCUMENTS

| | | | | | |
|---|---|---|---|---|---|
| 2,836,171 | A | * | 5/1958 | Cripe | 126/214 R |
| 3,503,324 | A | * | 3/1970 | Gmeiner | 99/393 |
| 4,237,856 | A | * | 12/1980 | Trombatore | 126/299 C |
| 4,627,410 | A | * | 12/1986 | Jung | 126/25 A |
| 5,090,398 | A | * | 2/1992 | Raymer et al. | 126/41 R |
| 5,333,540 | A | * | 8/1994 | Mazzocchi | 99/421 H |
| 5,452,706 | A | * | 9/1995 | Meza | 126/30 |
| 5,460,159 | A | * | 10/1995 | Bussey | 126/25 R |
| 5,873,355 | A | * | 2/1999 | Schlosser et al. | 126/41 R |
| 5,937,136 | A | * | 8/1999 | Sato | 386/288 |
| 6,189,528 | B1 | * | 2/2001 | Oliver | 126/25 R |
| 6,422,230 | B1 | * | 7/2002 | Stewart et al. | 126/25 R |
| 6,805,113 | B2 | * | 10/2004 | Stephen et al. | 126/25 R |
| 6,892,722 | B1 | * | 5/2005 | Francies, III et al. | 126/25 R |
| 6,925,998 | B2 | * | 8/2005 | Bruno et al. | 126/41 R |
| 6,951,213 | B2 | * | 10/2005 | Coleman et al. | 126/38 |
| 7,438,071 | B2 | * | 10/2008 | Johnson et al. | 126/25 R |
| 7,934,494 | B1 | * | 5/2011 | Schneider | 126/241 |
| 7,958,882 | B1 | * | 6/2011 | Sgourides | 126/9 R |
| 8,316,837 | B2 | * | 11/2012 | Malumyan | 126/25 R |
| 2005/0252504 | A1 | * | 11/2005 | Cabrera et al. | 126/50 |

* cited by examiner

*Primary Examiner* — Steven B McAllister
*Assistant Examiner* — Nikhil Mashruwala
(74) *Attorney, Agent, or Firm* — Zarley Law Firm, P.L.C.

(57) ABSTRACT

A portable grill assembly having a frame and a plurality of legs that are pivotally attached to the frame. A removable tray is matingly received within the frame and a screen is removably nested within the tray in spaced relation to the bottom of the removable tray to provide room for charcoal to be burned. At least one wind screen is detachably secured in the frame adjacent the grill to block wind from blowing on the grill. At least one wing is attached to the frame.

13 Claims, 9 Drawing Sheets

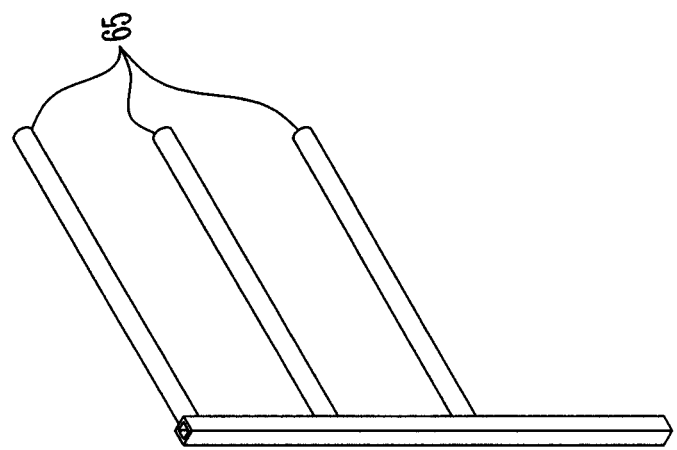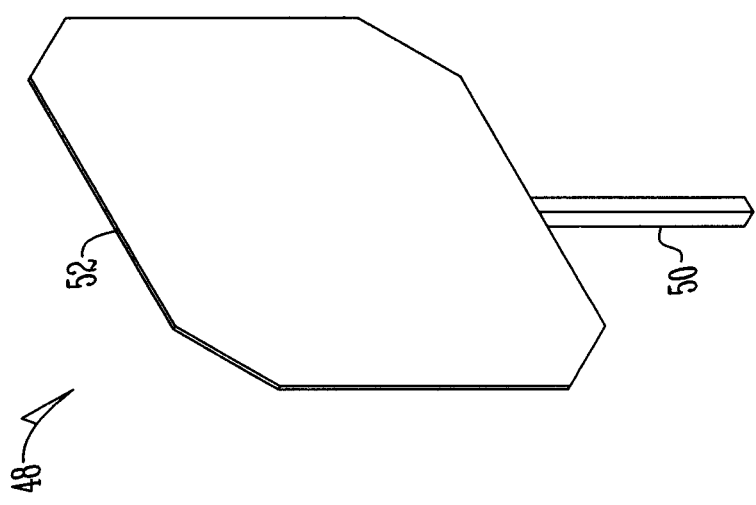

PORTABLE GRILL ASSEMBLY

BACKGROUND OF THE INVENTION

This invention relates to a portable grill assembly used for cooking purposes. More specifically, this invention relates to a collapsible portable grill assembly that can be easily transported and assembled.

Portable grills are known in the art and are used for things such as camping, tailgating, and the like. While useful in establishing a remote outdoor cooking set-up, conventional grills are difficult to transport, are unstable, or are difficult to assemble. Either conventional grills are large, cumbersome, and take up a substantial amount of space, or they are comprised of many pieces that take time and effort to assemble. Therefore, a need exists for a grill that addresses these deficiencies.

An object of the present invention is to provide a portable grill that is easy to transport.

Another object of the present invention is to provide a portable grill that is easy to assemble.

A still further object of the present invention is to provide a portable grill that addresses multiple cooking issues in a small space.

These and other objects, features, or advantages of the present invention will become apparent from the specification and claims.

BRIEF SUMMARY OF THE INVENTION

A portable grill assembly is supported by a plurality of pivotally attached legs. Matingly received within the frame is a removable tray having a screen that is nested within the tray. Attached to the frame is at least one wind screen and at least one wing.

BRIEF DESCRIPTION OF THE DRAWINGS

FIG. 5 is a top elevated view of a collapsible charcoal chimney;

DETAILED DESCRIPTION OF THE PREFERRED EMBODIMENT

Figure 1:
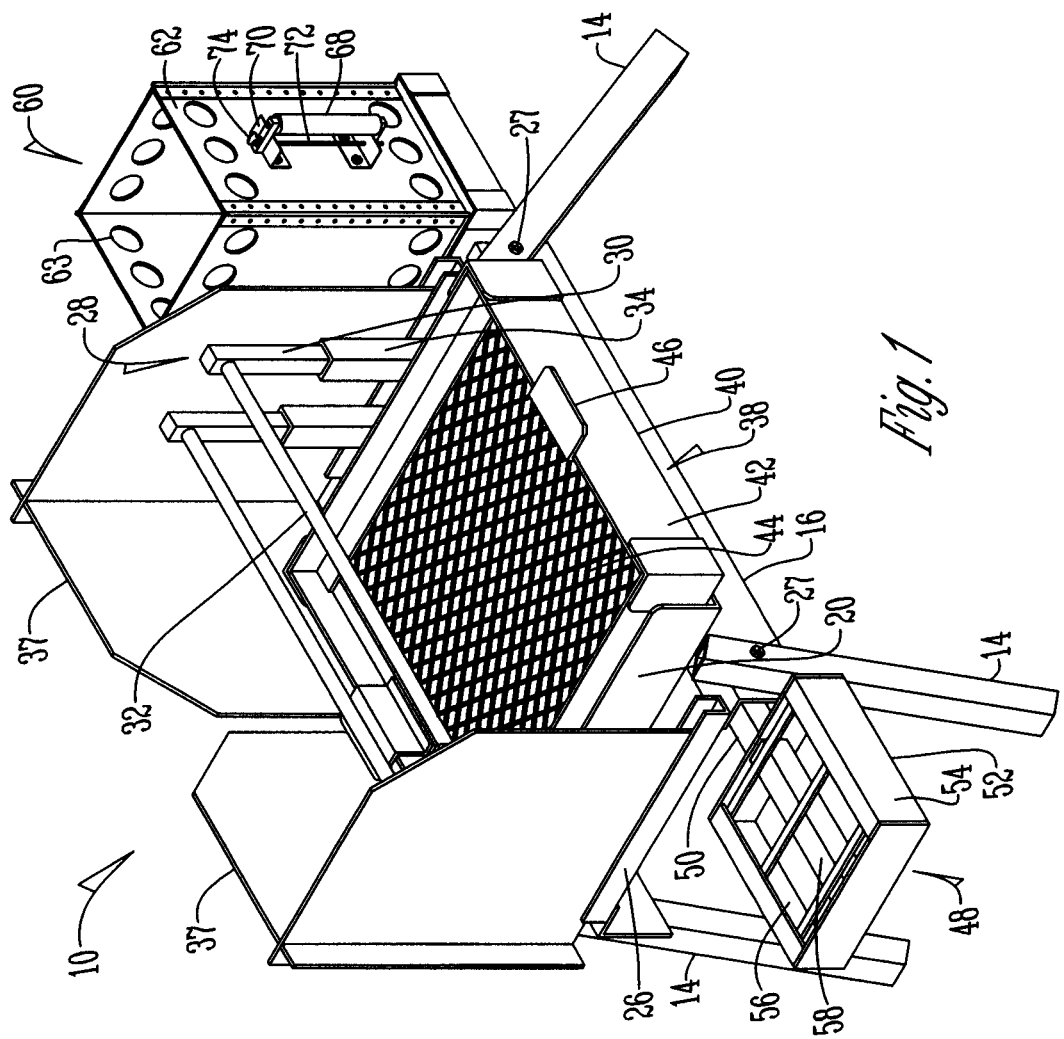
FIG. 1 is a front perspective view of a portable grill assembly.
Figure 2:
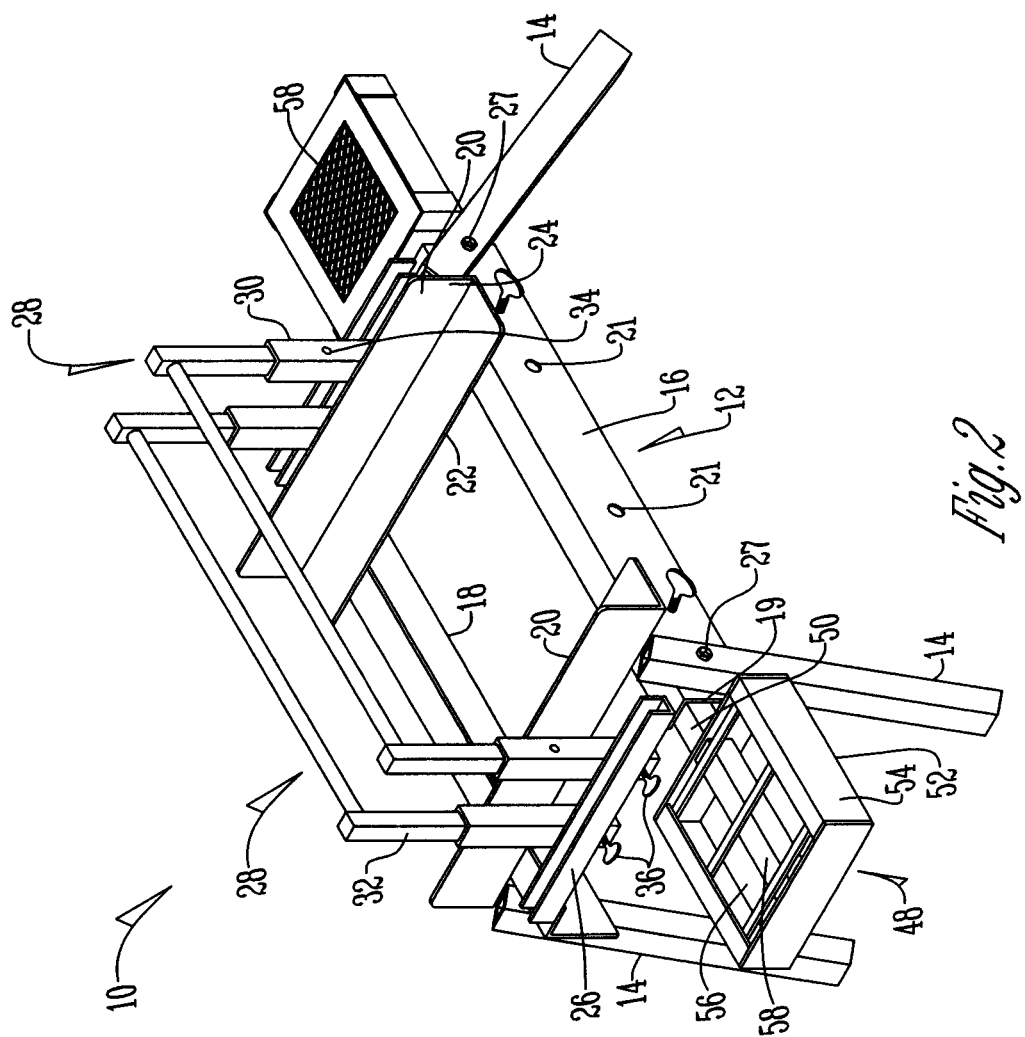
FIG. 2 is a front perspective view of a portable grill assembly.
Figure 3:
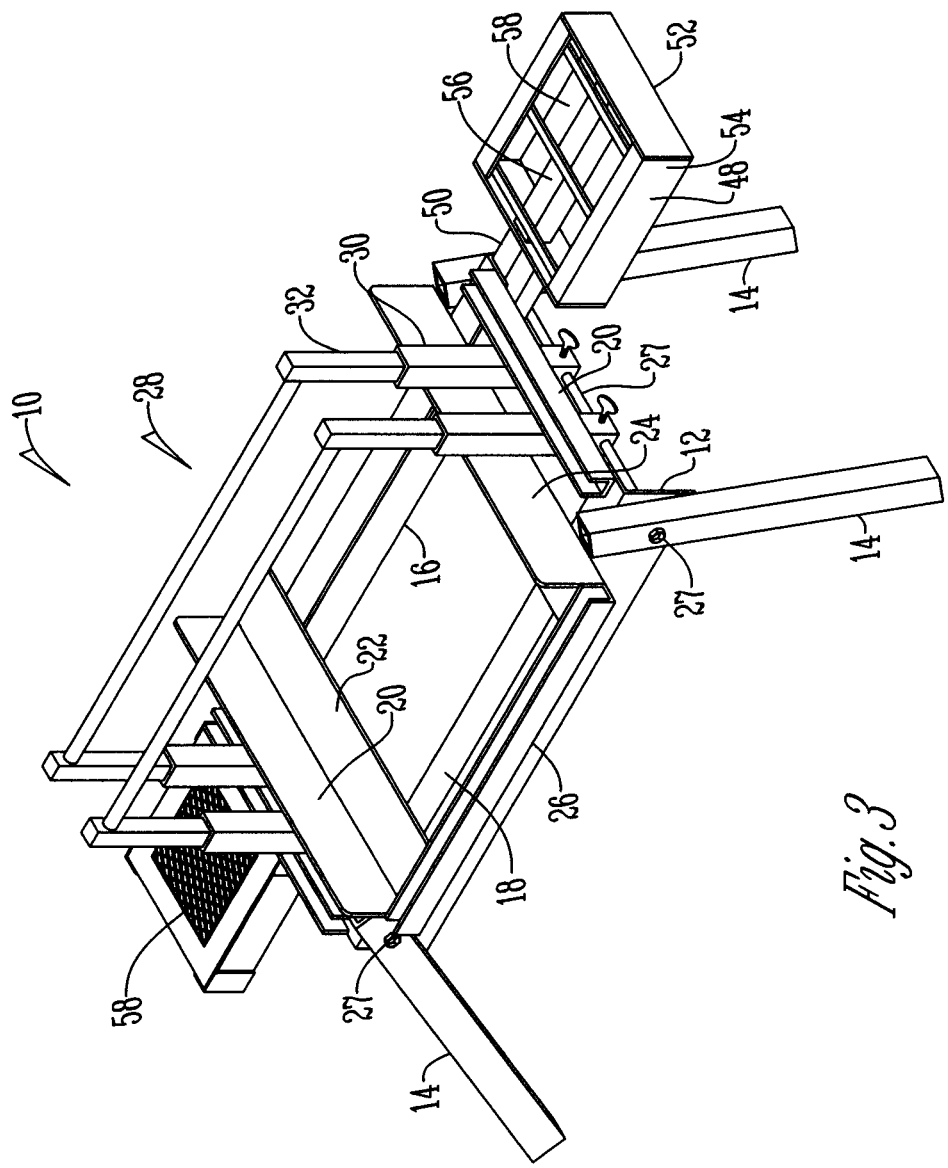
FIG. 3 is a back perspective view of a portable grill assembly.
Figure 4:
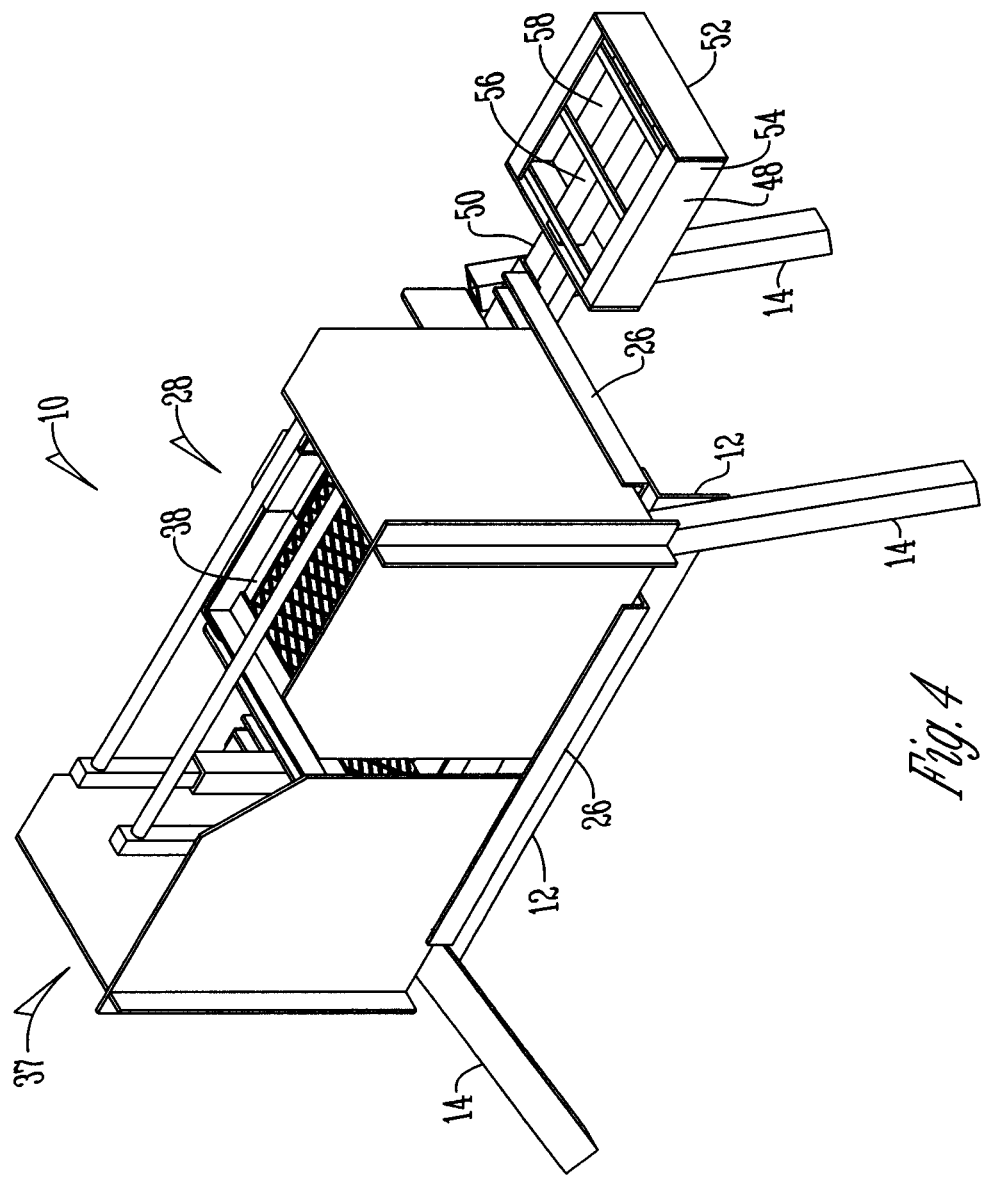
FIG. 4 is a back perspective view of a portable grill assembly using wind shields.
Figure 6:
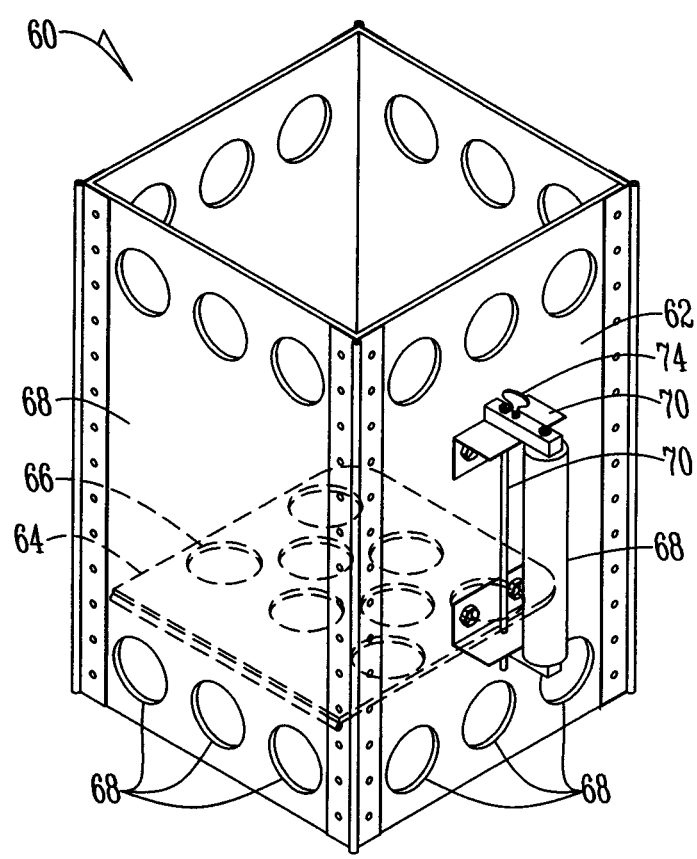
FIG. 6 is a perspective view of wings.

Referring to the Figures, the grill assembly 10 has a frame 12 that is supported by a plurality of legs 14. The frame 12 has front and back support members 16 and 18 that are connected to side support members 20. The front member 16 is comprised of a hollow tube 19 having a plurality of apertures 21. Preferably, back member 18 and side members 20 are L-shaped having a horizontal portion 22 and a vertical portion 24. The frame 12 also has a plurality of U-shaped slots 26 that are secured to the frame 12 and extend longitudinally in parallel spaced relation to the back member 18 and side members 20. The legs 14 are pivotally attached to the frame 12 by a pivot pin 27 that extends from the front member 16 to the back member 18.

Slidably connected to the pivot pin 27 is at least one and preferably two cooking support members 28. The cooking support member 28 has a bracket 30 that is positioned between the side members 20 and the U-shaped slots 26 that telescopically receive a C-shaped support bar 32. The bracket 30 has a plurality of apertures 34 that receive a pin 36 that are used to adjust the height of bar 32 in relation to bracket 30. The bracket is slidably secured to pivot pin 27 by a clamp or any other conventional means.

Formed to fit within the U-shaped slots 26 is at least one and preferably a plurality of wind screens 37. In one example four wind screens are used wherein grooves 39 near the end of two wind screens 37 matingly connect to secure the two wind screens 37 together at generally a right angle as shown in the Figures. The wind screens 37 are painted in colors and have printed indicia that are associated with a school, corporation, or organization.

A tray 38 is formed to be removably received within the L-shaped back and side members 16 and 20 of frame 12. The tray 38 has an open top, a bottom 40 and a sidewall 42 that forms a hollow chamber. A screen 44 having at least a pair of L-shaped supports 46 that extend outwardly are removably nested within the tray 40.

At least one, and preferably two wings 48 are slidably connected to front member 18. The wing 48 has a shaft 50 and a support base 52. The shaft 50 is telescopically received within front member 18. The support base 52 is flat as shown in FIG. 5. In alternative embodiments, a sidewall 54 extends upwardly from the support base 52 to form a compartment 56. A grid or screen 58 extends over the compartment 56. In one example, the grid is spaced to receive a plurality of individual charcoal briquettes. The wings 48 are used to provide an additional cooking or warming surface to burn additional charcoal or warm food items such as coffee.

To facilitate the burning of charcoal, a collapsible charcoal chimney 60 is used. The collapsible charcoal chimney 60 has four sidewalls 62 that are hingedly connected together and have a plurality of apertures 63 near the top edge. The apertures receive a comb 65. A plate 64 having a plurality of apertures 66 is hingedly attached to one of the sidewalls 62. Finally, a handle 68 is connected to the outer surface of a sidewall 62 by a bracket 70 and pivot pin 72. Located on the bracket 70 is a lock 74 such as a pin or detent that holds the handle in an operating position and when released permits the handle 68 to rotate such that the handle 68 lays flat against the sidewall 62.

A clip 75 is used to attach a grill basket 76 to the grill assembly 10. The clip 25 has two C-shaped claw portions 78 and 80 with portion 78 having a plurality of slots 82. Portion 80 is attached to bar 32 and portion 78 receives the wires 84 of the grill basket 76 to hold the grill basket in a generally horizontal position. Slots 82 receive wires 84 of the grill basket 76 when in a raised position and provide a stop to hold a portion of the grill basket in an open upright position.

Figure 7:
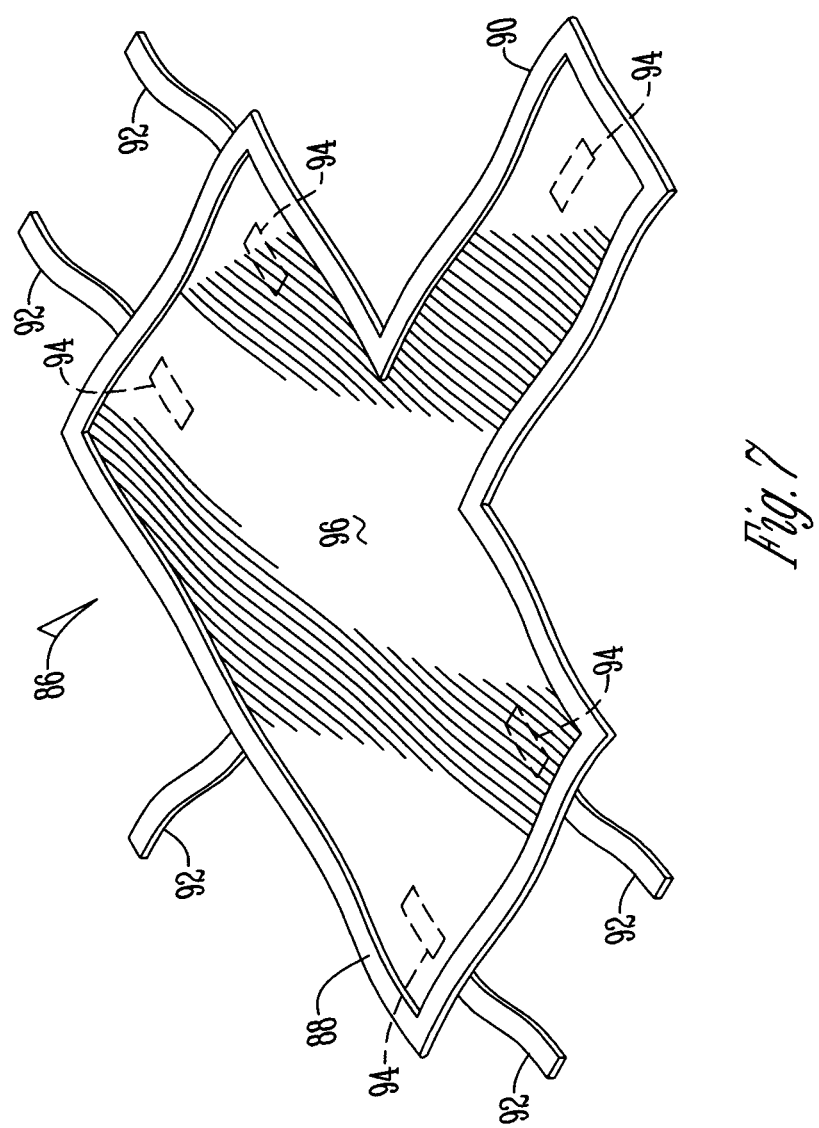
FIG. 7 is a top plan view of a bag.
Figure 8:
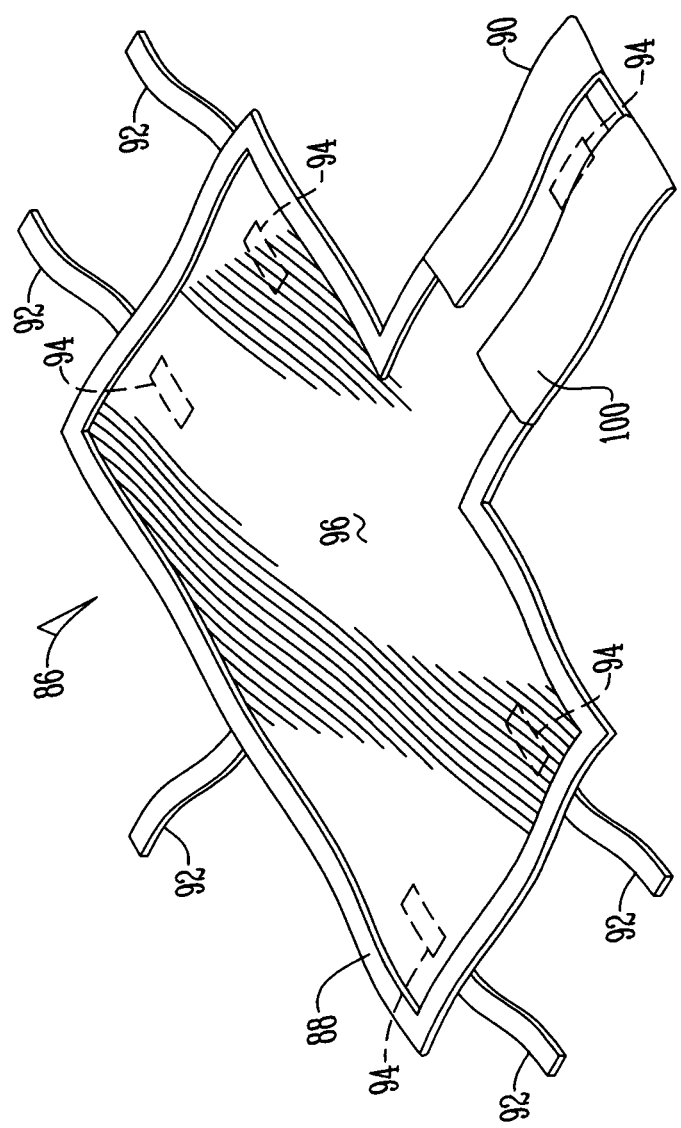
FIG. 8 is a top plan view of a bag with pockets.
Figure 9:
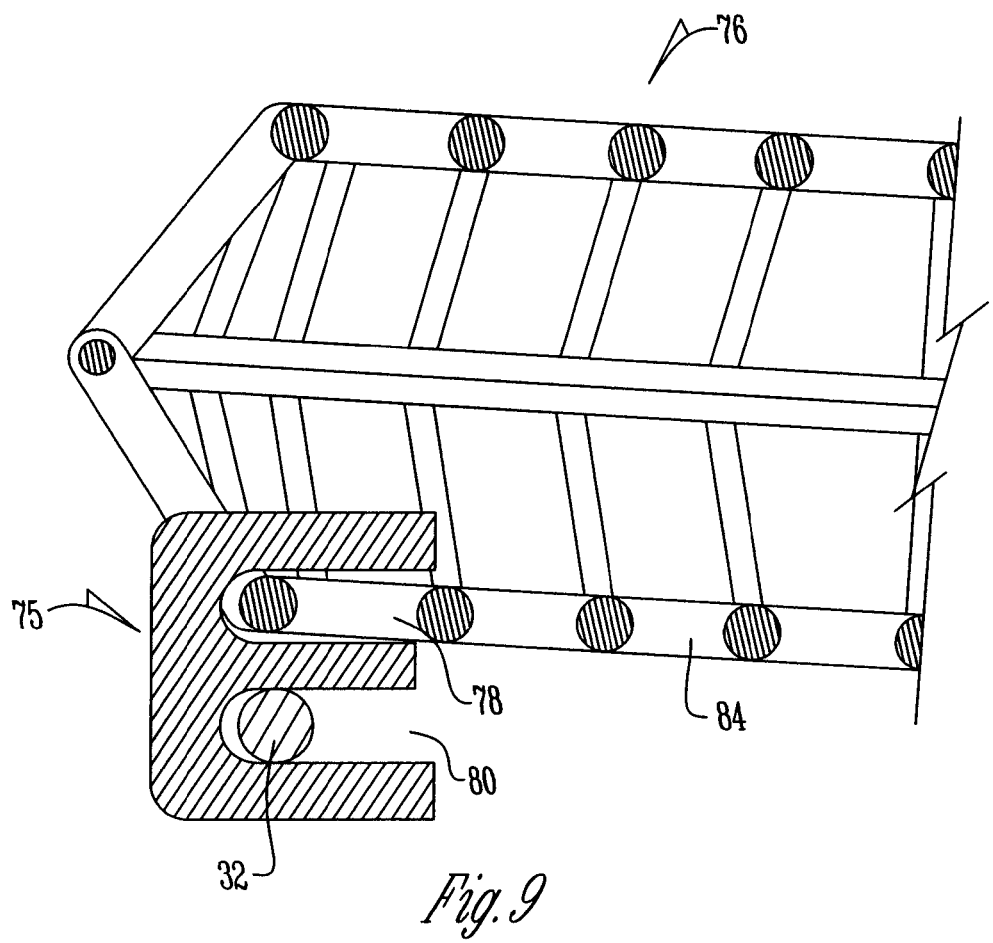
FIG. 9 is a side view of a clip.
Figure 10:
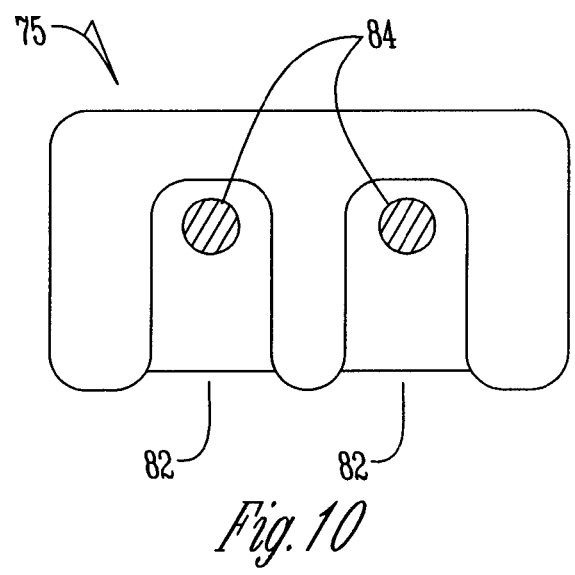
FIG. 10 is a top view of a clip.

A bag 86 is used to transport the grill assembly 10. As shown in FIG. 7, the bag 86 has a main portion 88 and a folding portion 90. The main portion has at least one fastening device 92 that extends outwardly from the main portion 88. The fastening device 92 is positioned to align with a fastening surface 94 when the ends of the main portion 88 are folded inwardly. The fastening device 92 and fastening surface are of any type such as a strap and buckle, straps that are tied, or a hook and loop combination. At least one additional fastening device 92 is attached to the main portion 88 and is positioned opposite the folding portion 90 and aligns with a fastening surface 94 when the folding portion 90 is folded over. The bag 86 has a heat resistant liner 96 on the interior surface which permits the grill assembly 10 to be placed in the bag 86 shortly after use for transport. The bag 86 also is placed underneath the grill assembly 10 on a support surface such as a plastic table to reflect the heat from the grill away from the table.

A second bag 98 is used to transport cooking utensils such as tongs, a lid holder, the charcoal chimney 60, a comb 65 and the like. The second bag 98 is similar to the first bag 86 except that the folding portion has a plurality of pockets 100 to hold the cooking utensils.

To assemble, the grill assembly 10 is removed from bag 86 and the legs 14 are pivoted from underneath the frame 12 to a support position. The brackets 30 are clamped to pivot pin 36 and slid along pivot pin 36 to a desired distance of separation. Support bar 32 is inserted in bracket 30 and set to the desired height and distance apart. Next, the wind screens 34 are matingly connected by grooves 36 and then inserted into the U-shaped slots 26. Finally, the shaft 50 of the wings 48 are inserted into the front member 18 and the tray 38 is placed within the L-shaped back and side members 16 and 20 of frame 12.

Thus, a grill assembly has been disclosed that at the very least meets all of the stated objectives.

What is claimed is:

1. A portable grill assembly comprising:
    a frame;
    a removable firebox matingly received within the frame; and
    at least one wing received within a front support member of the frame;
    a plurality of legs pivotally mounted to the frame by a pivot pin wherein the pivot pin extends from the front support member to a horizontal back support member of the frame;
    wherein at least one cooking support member is attached to the pivot pin; and
    wherein the cooking support member comprises a pair of brackets and a cooking support bar.

2. The grill assembly of claim 1 further comprising a screen nested within the firebox.

3. The grill assembly of claim 1 wherein at least one wind screen is attached to the frame.

4. The grill assembly of claim 1 wherein the wing has a shaft and a base support.

5. The grill assembly of claim 4 wherein the wing has a sidewall extending upwardly to form a compartment and a grid that extends over the compartment.

6. The grill assembly of claim 1 wherein the wing includes a base and a shaft slidably received within a hollow tube comprising the front support member.

7. The grill assembly of claim 1 wherein the frame includes side support members connected to the front and back support members.

8. The grill assembly of claim 7 wherein the frame additionally comprises a plurality of slots.

9. The grill assembly of claim 8 wherein the plurality of slots extend longitudinally from the back support member in parallel spaced relation to the side support members.

10. The grill assembly of claim 9 additionally comprising a plurality of wind screens mounted to the frame within the slots.

11. A portable grill assembly comprising:
    a frame having a front support member and a back support member connected to side support members;
    a removable firebox matingly received within the frame;
    a pin that extends from the front support member to the back support member; and
    at least one cooking support member having a bracket which is mounted on and slidable relative to the pin wherein the bracket receives a support bar having an adjustable height in relation to the bracket.

12. The grill assembly of claim 11 wherein the support bar is C-shaped and is telescopically received within the bracket.

13. The grill assembly of claim 12 wherein the bracket is positioned between the side support members and slots which extend longitudinally in parallel spaced relation to the side support members wherein wind screens are mounted to the frame within the slots.

* * * * *